United States Patent
Chao et al.

(10) Patent No.: US 6,874,113 B2
(45) Date of Patent: Mar. 29, 2005

(54) RADIO RESOURCE CONTROL-SERVICE DATA UNIT RECEPTION

(75) Inventors: Yi-Ju Chao, Huntington Station, NY (US); Stephen E. Terry, Northport, NY (US); Julio Dineiro, Smithtown, NY (US); James Miller, Verona, NJ (US); Carl Wang, Flushing, NY (US); Janet Stern-Berkowitz, Little Neck, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 421 days.

(21) Appl. No.: 10/226,082

(22) Filed: Aug. 22, 2002

(65) Prior Publication Data

US 2003/0061557 A1 Mar. 27, 2003

Related U.S. Application Data

(60) Provisional application No. 60/322,664, filed on Sep. 17, 2001.

(51) Int. Cl.$^7$ .............................................. G08G 25/02
(52) U.S. Cl. ...................................... 714/748; 714/758
(58) Field of Search ......................... 714/748, 18, 746, 714/758, 818, 41

(56) References Cited

U.S. PATENT DOCUMENTS

| | | | | |
|---|---|---|---|---|
| 3,743,819 A | * | 7/1973 | Kapsambelis et al. | ...... 235/435 |
| 5,845,086 A | * | 12/1998 | Doebrich et al. | ........... 709/238 |
| 6,424,637 B1 | | 7/2002 | Pecen et al. | |
| 6,456,826 B1 | | 9/2002 | Toskala et al. | |

* cited by examiner

Primary Examiner—Phung My Chung
(74) Attorney, Agent, or Firm—Volpe and Koenig, P.C.

(57) ABSTRACT

A method for processing a received communication which includes periodic transmissions of a set of information segments. A first transmission of the set of information segments is received and processed to identify each of the segments as valid or invalid. The valid segments of the first set are then stored. Where all segments of the set are not stored, subsequent transmissions of the set of information segments are received and only those segments not previously stored are processed to identify each such segment as valid or invalid. The valid segments so identified are then stored. Subsequent transmissions are repeatedly received unless all segments of the set have been stored.

21 Claims, 4 Drawing Sheets

RADIO RESOURCE CONTROL-SERVICE DATA UNIT RECEPTION

CROSS REFERENCE TO RELATED APPLICATIONS

The application claims priority from Provisional Patent Application No. 60/322,664, filed Sep. 17, 2001.

BACKGROUND

The Universal Mobile Telecommunications Systems (UMTS) network architecture, illustrated in FIG. 1, includes a core network (CN) 2, a UMTS Terrestrial Radio Access Network (UTRAN) 3, and at least one User Equipment (UE) 18, (only one UE 18 being shown for simplicity). The two general interfaces are the Iu interface between the UTRAN and the core network as well as the radio interface Uu between the UTRAN and the UE.

The UTRAN consists of several Radio Network Subsystems (RNSs) 10, 11. They can be interconnected by the Iur interface. Each RNS 10, 11 is divided into a Radio Network Controller (RNC) 12, 13 and several base stations (Node Bs) 14–17. The Node Bs 14–17 are connected to the RNCs 12, 13 by the Iub interface. One Node B 14–17 can serve one or multiple cells.

The UTRAN 3 supports both FDD mode and TDD mode on the radio interface. For both modes, the same network architecture and the same protocols are used.

Communication between the Node Bs 14–17 and the UEs 18 over the radio interface Uu is conducted using a Radio Interface Protocol. The Radio Interface Protocol Stack architecture is illustrated in FIG. 2. As those skilled in the art would realize, the design of the Radio Interface Protocol Stack 20 is divided into three layers: the physical layer (L1) 21, the data link layer (L2) 22, and the network layer (L3) 23. L2 is split into four sublayers: the Medium Access Control (MAC) 24, the Radio Link Control (RLC) 25, the Broadcast/Multicast Control (BMC) 27, and the Packet Data Convergence Protocol (PDCP) 26.

L3 23 contains the Radio Resource Control (RRC) 28. The RRC handles the control plane signaling of L3 between the UTRAN 3 and the UEs 18. It is also responsible for configuration and control of all other protocol layers in the UTRAN 3 and for controlling the available radio resources. This includes assignment, reconfiguration and release of radio resources, as well as continuous control of the requested Quality of Service.

The Radio Link Control (RLC) layer 25 provides transparent, unacknowledged or acknowledged mode data transfer to the upper layers. The acknowledged mode transfer uses a sliding window protocol with selective reject-automatic repeat request.

The MAC layer 24 maps the logical channels of the RLC 25 on the transport channels, which are provided by the physical layer. The MAC layer 24 is informed about resource allocations by the RRC 28, and mainly consists of a multiplexing function. The priority handling between different data flows, which are mapped onto the same physical resources, is also done by the MAC layer 24. The function and operation of the BMC 27 and the PDCP 26 are well known to those of skill in the art and will not be explained in greater detail herein.

The physical layer 21 is responsible for the transmission of transport blocks over the air interface. This includes forward error correction, multiplexing of different transport channels on the same physical resources, rate matching, (i.e., matching the amount of user data to the available physical resources), modulation, spreading and radio frequency RF processing. Error detection is also performed by the physical layer 21 and indicated to the higher layers 22, 23.

The data flow through L2 22 is shown in FIG. 3. The higher layer Protocol Data Units (PDUs) are passed to the RLC layer 25. In the RLC layer 25, the Service Data Units (SDUs) are segmented and concatenated. Together with the RLC header, the RLC PDUs are built. No error detection code is added in the RLC layer 25. For transparent-mode RLC, no segmentation on the RLC layer 25 is performed and neither the RLC header nor the MAC header are added to higher layer PDUs.

In the MAC layer 24, only a header is added. This header can contain routing information which describes the mapping of logical channels to transport channels. On common channels, a UE identification can also be included.

In L1 21 (the physical layer), a CRC is added for error detection purposes. The result of the CRC check in the receiver is passed to the RLC layer 25 for control of retransmissions.

In current UMTS TDD or FDD systems, a radio resource control service data unit (RRC-SDU) may be sent in RLC transparent, unacknowledged or acknowledged modes between the UTRAN-RRC and the UE-RRC. The acknowledged mode will not be discussed hereinafter. However, when an RRC-SDU is transported in the transparent or unacknowledged modes, the RLC and MAC layers of the receiving side are not aware of the RRC-SDU. Therefore, any errors in the received RRC-SDU caused during transmission or by other sources, must be performed at the RRC layer, instead of at the lower layers.

The RRC-SDU may be transmitted in several individual segments known as transport blocks (TB). An example of an RRC-SDU is the broadcast control channel system information blocks (BCCH-SIB).

In the case of the BCCH-SIB, from the UTRAN-RRC to the UE broadcast control functional entity (UE-BCFE), TBs associated with this SIB are repeatedly retransmitted. SDU version indications are identified by "value tags". When the value tag does not change, the UE 18 assumes that the UTRAN is repeatedly sending identical BCCH-SIBs. If there are changes in the BCCH-SIB transmitted from the UTRAN 3, the UTRAN 3 uses the value tag to indicate to the UE 18 that there has been a change. Scheduling information, when the TBs of a BCCH-SIB should arrive at the UE 18, and the version of the BCCH-SIB, are known to the UE 18 in advance of transmission from the UTRAN 3.

FIG. 4 is an illustration of the UE 18 receiving an LI SDU. The SDU comprises the TB, which carries, for example, the BCCH-SIB; and a CRC, which is used by L1 of the UE 18 to perform transmission error detection. As illustrated, the TB may also include the system frame number (SFN), as is the case for a TB of the BCCH-SIB, which indicates the time when the TB should arrive at the UE 18. Alternatively, for a TB that does not explicitly contain the SFN, the SFN of arrival can be derived by L1 from physical layer timing. L1 of the UE 18 passes the TB, SFN and CRC result to the higher layers. However, since the RLC and MAC layers 25, 24 operate in transparent mode for broadcast channel (BCH) data, the TB is passed to the RRC layer.

Since TBs are often transmitted between the UE 18 and the UTRAN 3 in a fading environment, transmission of TBs is associated with a targeted probability of successful transmission/reception, for example ninety-nine percent (99%). If a BCCH-SIB consists of a large number of TBs, the probability of correctly receiving all of the TBs of a BCCH-SIB is approximated at 0.99 raised to the power of the number of TBs. For example, a BCCH-SIB of a broadcast control channel (BCCH) may need more than ten TBs to transmit; in this case, the probability of the UE 18 successfully receiving the BCCH-SIB is (0.99) to the 10, which is less than ninety percent (90%). Accordingly, the probability of successful reception of the BCCH-SIB decreases as the number of TBs increases.

In UMTS TDD or FDD systems, the time to successfully receive the SIBs determines the performance for many system functions. Additionally, to maintain proper performance of these system functions, SIB repetition rates may have to be increased to compensate for failed transmissions, which reduces radio resource efficiency and utilization.

FIGS. 5 and 6 are an illustration and a flow diagram, respectively, of a current method used for successfully receiving an RRC SDU transmitted by the UTRAN 3 to the UE 18. As shown, the UE-BCFE receives the RRC-SDU (Step 60) which, for purposes of this example, comprises 9 TBs, labeled from SFN=2 to SFN=18 at a repetition rate of 64 frames. The UE-BCFE reads the RRC-SDU and determines if there is a TB in error or missing from the RRC-SDU (Step 61). For purposes of this example, SFN 10 is assumed to have an error. Since an error exists in the received RRC-SDU, the UE-BCFE discards the entire RRC-SDU and waits the repetition rate, i.e. 64 frames, to receive another RRC-SDU carrying the same information (Step 62). Once again the UE-BCFE receives the RRC-SDU, comprising 9 TBs, labeled from SFN=66 to SFN=82 (Step 63), and determines if an error is present (Step 61). In this example, SFN 70 (SFN 6+64 (repetition rate)) has an error or is missing. If no error is found in the received RRC-SDU, the UE-BCFE successfully receives and decodes the RRC-SDU (Step 64). Otherwise, as in the present case, the UE-BCFE discards the entire received RRC-SDU (Step 62) comprising 9 TBs and waits the repetition rate to receive the next RRC-SDU (Step 63). This process continues until the UE-BCFE receives nine (9) consecutive TBs which are correct.

There are two areas of concern with this type of method for receiving the RRC-SDU from the UTRAN. The first area is in the latency of proper/correct reception, which results in reduced performance of system functions requiring system information and or increased reception, thereby reducing radio resource efficiency. The second is when the UE L1 is required to repeatedly receive, decode and process all TBs in the RRC-SDU each time there is an error, this results in high processing and battery costs.

Therefore, there exists a need for an improved UMTS TDD or FDD system.

SUMMARY

A method for processing a received communication which includes periodic transmissions of a set of information segments includes a first transmission of the set of information segments which is received and processed to identify each of the segments as valid or invalid. The valid segments of the first set are then stored. When all segments of the set are not valid and stored, subsequent transmissions of the set of information segments are transmitted, and only those segments not previously identified as valid stored are received and processed to identify whether each such retransmitted segment is valid or invalid. The valid segments so identified are then stored. Subsequent transmissions are repeatedly received until all segments of the set have been identified as valid and stored.

BRIEF DESCRIPTION OF THE DRAWING(S)

DETAILED DESCRIPTION OF THE PREFERRED EMBODIMENT(S)

Figure 1:
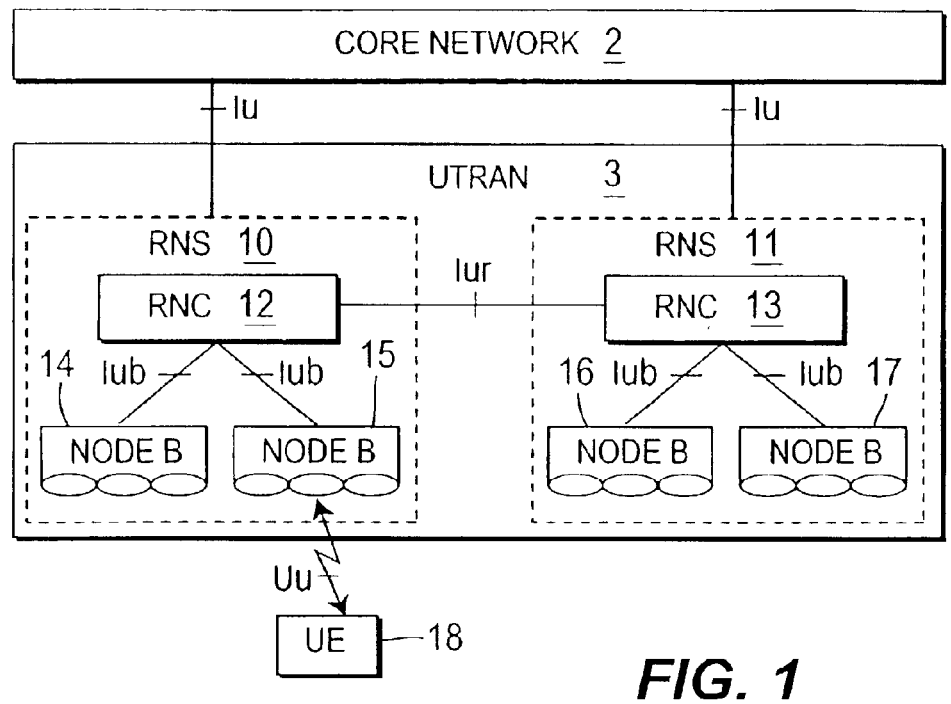
FIG. 1 is a block diagram of a universal mobile telecommunications system (UMTS).
Figure 2:
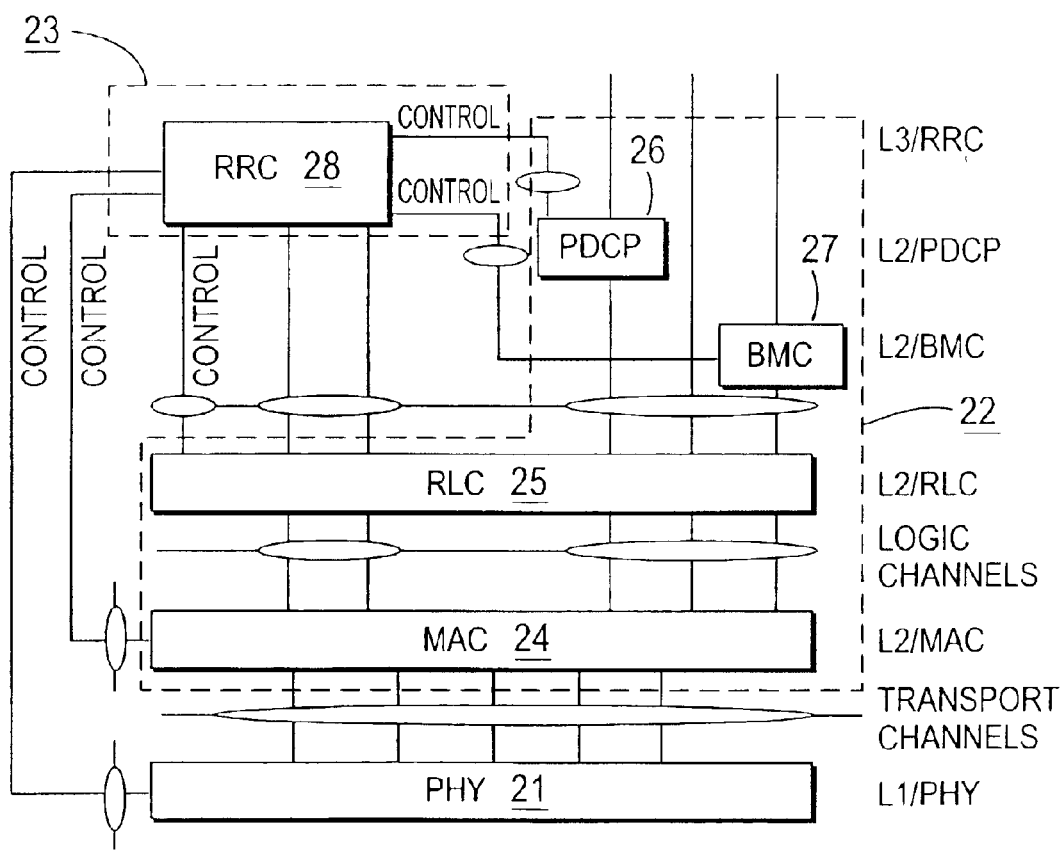
FIG. 2 is an illustration of a radio interface protocol stack architecture.
Figure 3:
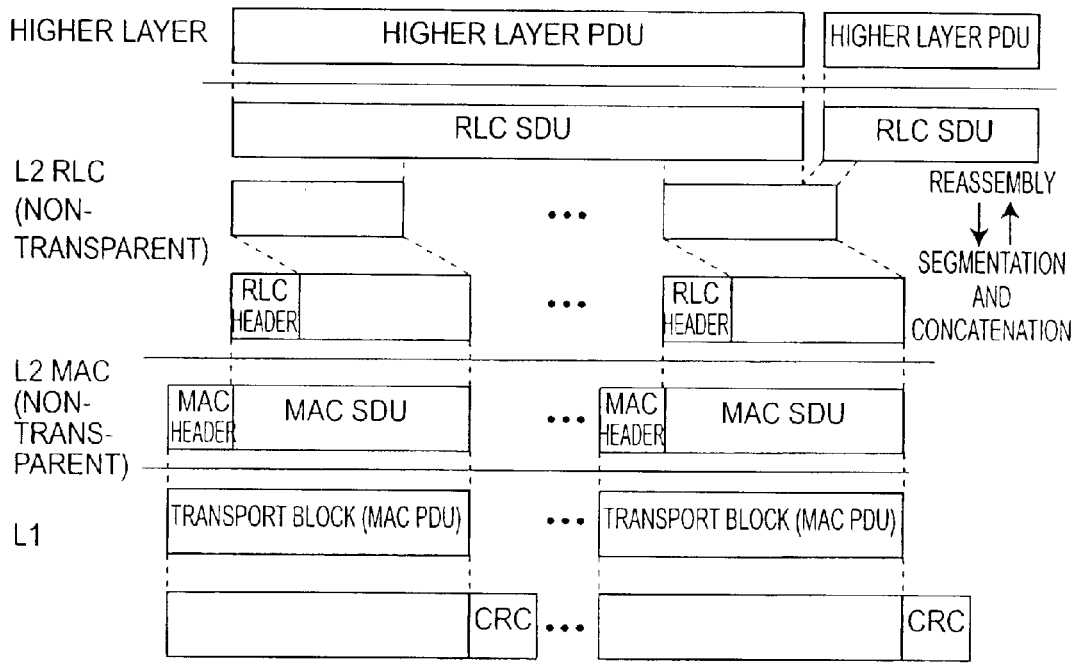
FIG. 3 is an illustration of the data flow through layer 2.

The preferred embodiment of the present invention will be described with reference to the drawing figures wherein like numerals represent like elements throughout.

Figure 4:
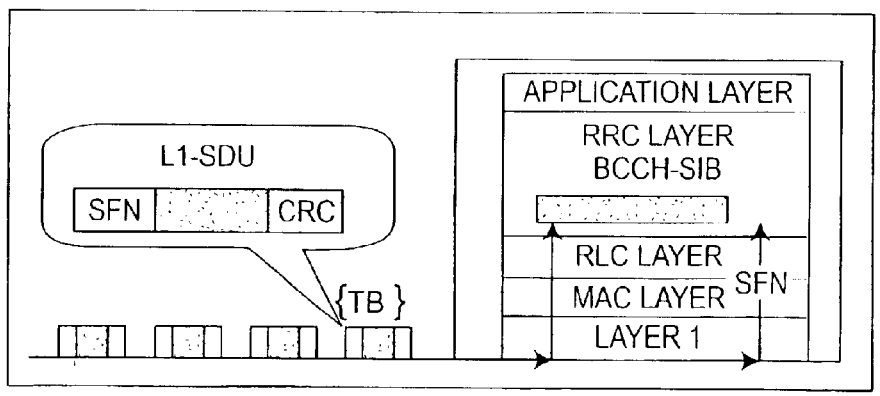
FIG. 4 is an illustration of a UE receiving a Layer 1 SDU.
Figure 5:
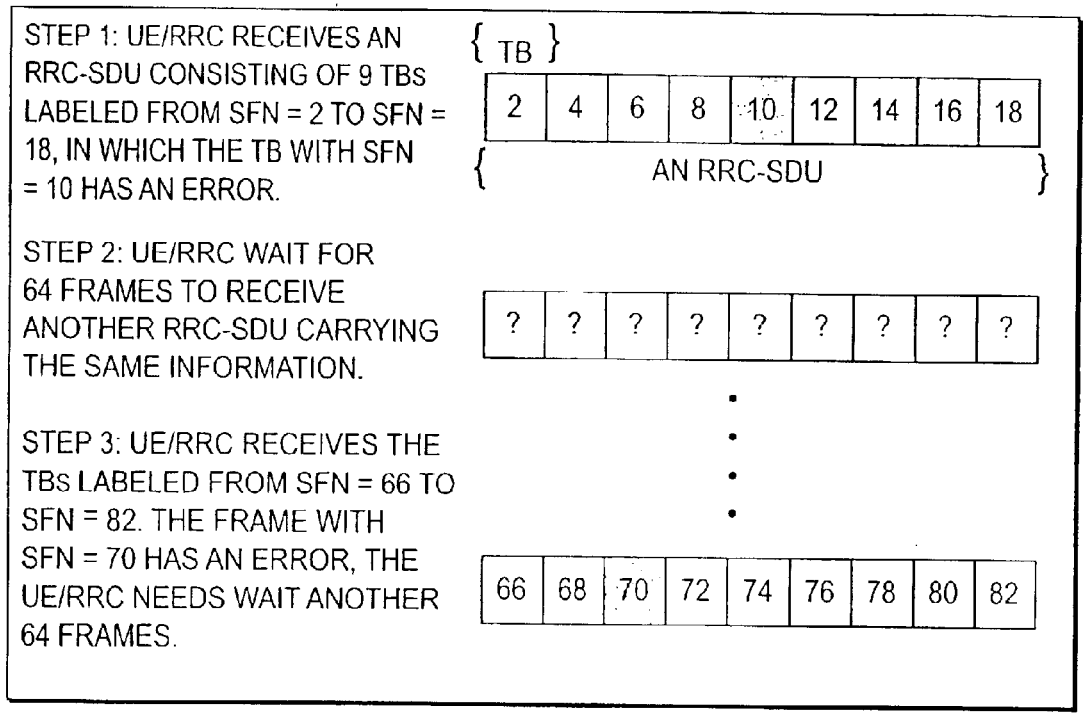
FIG. 5 is an illustration of a current method used for receiving the RRC-SDU.
Figure 6:
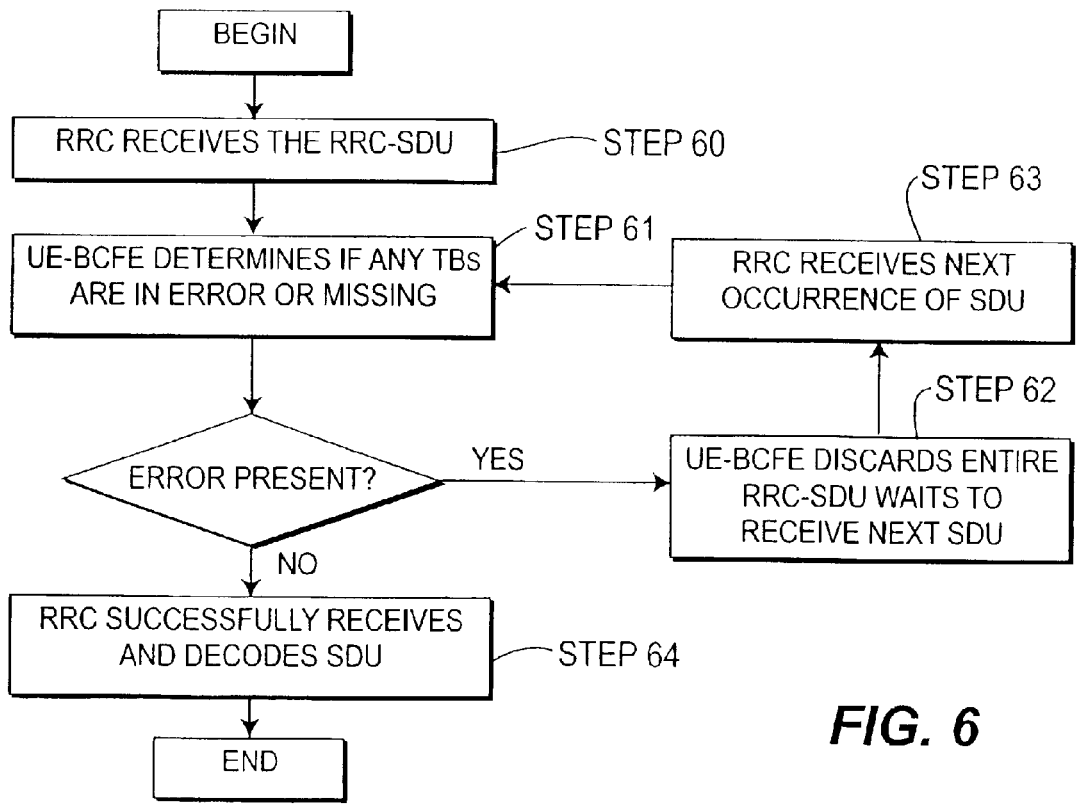
FIG. 6 is a flow diagram of a current method used for receiving the RRC-SDU.

Referring back to FIG. 4, the UE-L1 passes a received TB set, the SFN, and the CRC-error-detection result of each TB to the higher layers, (L2 and L3). Since the MAC and RLC layers 24, 25 operate in transparent mode for the BCCH, for example, the BCCH TBs can be forwarded to the L3 without processing. It is also possible that TBs with CRC errors are discarded by L2 or L3 before forwarding to L3.

Figure 7:
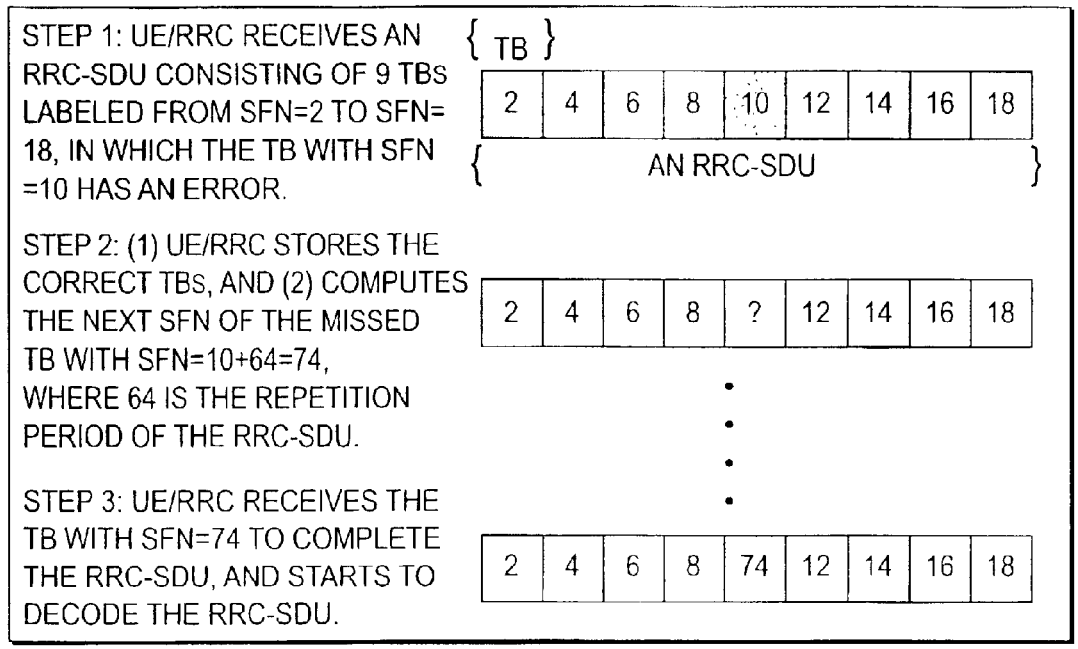
FIG. 7 is an illustration of a method for receiving the RRC-SDU in accordance with the preferred embodiment of the present invention.
Figure 8:
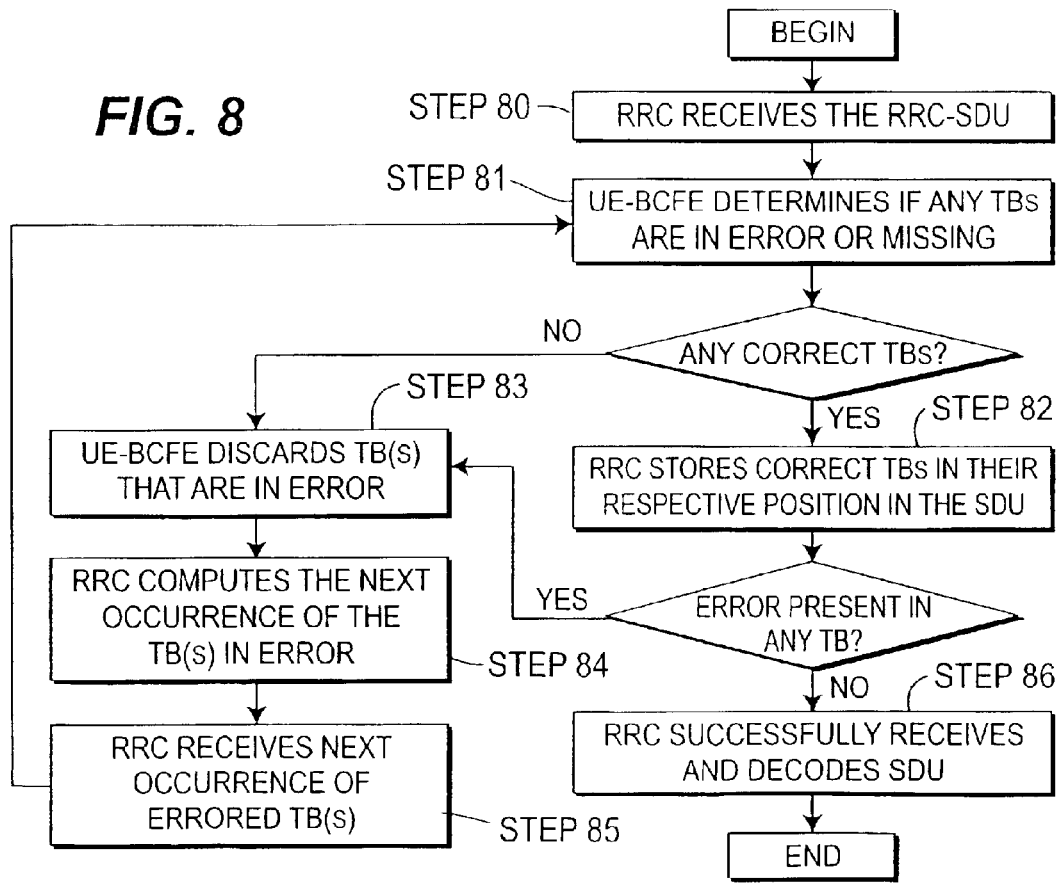
FIG. 8 is a flow diagram of a method for receiving the RRC-SDU in accordance with the preferred embodiment of the present invention.

FIGS. 7 and 8 are an illustration and flow diagram, respectively, of the method used in the preferred embodiment of the present invention. FIG. 7 illustrates an example scenario wherein an RRC-SDU is composed of nine (9) TBs with a repetition period of 64 frames. The UE-BCFE is informed in advance to expect the RRC-SDU from SFN=2 to SFN=to 18. The UE-BCFE receives the set of TBs corresponding to the RRC-SDU from one of the Node Bs 14–17 (Step 80) and determines whether one or more TBs are missed or have an error (Step 81).

In accordance with the preferred embodiment of the present invention, there are at least two ways for the UE-BCFE to make this determination. The first way is for the UE L1 to detect if there is a transmission error using the CRC error detection and inform the UEBCFE of the SFN(s) of the errored TB(s). The second method is for the UE-BCFE to utilize the scheduling information and SFN(s) of correctly received TBs to determine TBs that have not been successfully received. Although only two methods for making such a determination of whether TBs are in error or missing have been disclosed herein, other methods may be utilized which fall within the scope of the present invention.

Once this determination has been made by the UE-BCFE, those TBs that are correct are stored by the UE-BCFE (Step 82) and the TBs which are missing or in error are discarded (Step 83). It should be noted that step 83 may be similarly accomplished by either L1 or L2 in advance of UE-BCFE processing. The RRC 28 then computes the next SFNs of all errored or missing TBs for the next RRC-SDU transmission (Step 84). Using the example illustrated in FIG. 7, the UE-BCFE would add the errored TB (SFN 10) to the repetition period of 64 to determine the next occurance of the SFN, which in this example is 74. It is also possible that several TBs may be in error, and in this case, the SFN of each failed TB in the subsequent RRC-SDU transmission is calculated. Once the SFNs corresponding to each of the failed TBs in the subsequent transmission have been determined by the UE-BCFE, the RRC 28 informs L1 to only receive and decode the determined SFNs. In this example, only one TB corresponding to SFN 74 is identified for re-reception. Once the L1 receives the TBs for the calculated next SFNs, L1 forwards only the TBs, SFNs and CRCs to the RRC 28 of the particular SFNs requested by the RRC 28 (Step 85). If no error is detected in the set of retransmitted and received TBs, and no further TBs are missing from the RRC-SDU, the UE-BCFE stores the correct TBs in their place along with the other correct TBs (Step 82) and decodes the RRC-SDU (Step 86). If there are still TBs with CRC-errors for the received RRC-SDU, the RRC 28 determines such SFNs and repeats the process disclosed above (Step 84). This process continues until the complete set of TBs associated with the RRC-SDU have been stored by the UE-BCFE and processed by the RRC 28 (Step 86).

The present invention is applicable to all segmented RRC-SDUs that are periodically transmitted. The procedure starts upon detection of an updated value tag. If reception is in progress and a value tag is updated, all TBs of the previous set are deleted by the UE-BCFE.

One advantage of the present invention is that the successful RRC-SDU reception time, or (latency), is significantly reduced to the latency associated with the targeted error rate of the transmission of individual TBs between the UE 18 and the UTRAN 3, independent of the size of a RRC-SDU. Reduced reception latency improves the performance of UE functions associated with acquisition of system information such as faster cell search, reduced handover transmission break period, faster establishment of RAN connections and transitions between UE states.

Further, since the invention allows for more UE 18 efficient reception of system information, it is therefore possible to reduce scheduling rates, (i.e., the period of retransmission). This results in improved efficiency and greater utilization of limited BCCH physical resources.

Another advantage of the present invention is that the UE processing and battery consumption is reduced. With the ability to detect an individual TB reception error and the knowledge of TB scheduling information, the UE 18 can initiate reception only for the particular failed TBs rather than receiving the entire RRC-SDU. Additionally, UE battery and processing are further reduced due to the fact that successful RRC-SDU reception is achieved with fewer transmissions.

This invention can be applied to make the UE-BCFE receiving an RRC-SDU, such as the BCCH-SIB on the BCH faster and with reduced UE processing/battery consumption.

While the present invention has been described in terms of the preferred embodiment, other variations which are within the scope of the invention as outlined in the claims below will be apparent to those skilled in the art.

What is claimed is:

1. A method for receiving periodic transmissions of a set of N information segments, comprising the steps of:
   a) receiving a transmission of the set of information segments;
   b) processing each segment for which a valid segment has not been stored to identify that segment as valid or invalid;
   c) storing said valid segments;
   d) determining whether N different segments of the set are stored;
   e) where N different segments have not been stored, repeating steps (a–d); and
   f) after N different segments are stored, forwarding said stored set for further processing.

2. The method of claim 1 wherein said processing step further includes the steps of:
   detecting an error in any of said segments using an error code included with each of said segments; and
   determining a segment number of each of said segments in which the error was detected.

3. The method of claim 2 wherein said information segments include a value tag indicative of information included in said information segments.

4. The method of claim 3 wherein a first transmission and subsequent transmissions have equivalent value tags.

5. The method of claim 4 wherein said stored valid segments are deleted when said first transmission and said subsequent transmissions have value tags which are not equivalent.

6. The method of claim 5 wherein said information segments comprise broadcast control channel system information blocks.

7. The method of claim 1 wherein said periodic transmission is received after a predetermined repetition rate.

8. A user equipment (UE) for processing a received communication which includes periodic transmissions of a set of N information segments, comprising:
   a receiver for receiving a transmission of the set of N information segments;
   a processor means for processing each segment for which a valid segment has not been stored to identify that segment as valid or invalid;
   a memory for storing said valid segments;
   whereby said receiver receives and processes one or more only those segments not previously stored in subsequent transmissions of the set of N information segments, to identify each such segment as valid or invalid and storing said valid segments so identified;
   said receiver continuing to receive said subsequent transmissions until all segments of the set have been stored.

9. The UE of claim 8, wherein said receiver further detects a segment number in any of said segments using an error code included with each of said segments and determines a segment number of each of said segments in which the error was detected.

10. The UE of claim 9 wherein said first transmission and said subsequent transmissions have equivalent value tags.

11. The UE of claim 10 wherein said stored valid segments are deleted when said first transmission and said subsequent transmissions have value tags which are not equivalent.

12. The UE of claim 8 wherein said information segments include a value tag indicative of information included in said information segments.

13. The UE of claim 11 wherein said information segments comprise broadcast control channel system information blocks.

14. The UE of claim 8 wherein said periodic transmission is received after a predetermined repetition rate.

15. A method for processing a received communication which includes periodic transmissions of a set of information segments, comprising the steps of:

a) receiving a first transmission of the set of information segments;
b) processing said segments to identify each said segment as valid or invalid;
c) storing said valid segments of said set;
d) for invalid segments of said set, receiving at least one subsequent transmission and processing only those segments which were previously identified as invalid and storing said valid segments so identified; and
e) repeating step d until all segments of the set have been identified as valid and stored.

16. The method of claim 15 wherein said processing includes the steps of:
detecting an error in any of said segments using an error code included with each of said segments; and
determining a segment number of each of said segments in which the error was detected.

17. The method of claim 16 wherein said information segments include a value tag indicative of information included in said information segments.

18. The method of claim 17 wherein said first transmission and said subsequent transmissions have equivalent value tags.

19. The method of claim 18 wherein said valid segments are deleted when said first transmission and said subsequent transmissions have value tags which are not equivalent.

20. The method of claim 19 wherein said information segments comprise broadcast control channel system information blocks.

21. The method of claim 15 wherein said periodic transmission is received after a predetermined repetition rate.

* * * * *

UNITED STATES PATENT AND TRADEMARK OFFICE
CERTIFICATE OF CORRECTION

PATENT NO. : 6,874,113 B2
DATED : March 29, 2005
INVENTOR(S) : Chao et al.

It is certified that error appears in the above-identified patent and that said Letters Patent is hereby corrected as shown below:

Column 1,
Line 21, before the word "interface", delete "Iur" and insert therefor -- Iur --.
Line 24, before the word "interface", delete "Iub" and insert therefor -- Iub --.

Column 2,
Line 52, after the word "BCCH-SIB", delete ";".

Column 4,
Line 40, after the first instance of the word "to", delete "SFN=to 18" and insert therefor -- SFN=18 --.
Line 48, after the first instance of the word "the", delete "UEBCFE" and insert therefor -- UE-BCFE --.

Signed and Sealed this

Twenty-third Day of August, 2005

JON W. DUDAS
*Director of the United States Patent and Trademark Office*